US012671919B2

(12) United States Patent
Li et al.

(10) Patent No.: US 12,671,919 B2
(45) Date of Patent: Jun. 30, 2026

(54) SILICON PHOTONICS-BASED CHIPLET ACCELERATOR FOR DNN INFERENCE

(71) Applicant: The George Washington University, Washington, DC (US)

(72) Inventors: Yuan Li, Washington, DC (US); Ahmed Louri, Washington, DC (US)

(73) Assignee: The George Washington University, Washington, DC (US)

( * ) Notice: Subject to any disclaimer, the term of this patent is extended or adjusted under 35 U.S.C. 154(b) by 185 days.

(21) Appl. No.: 18/623,897

(22) Filed: Apr. 1, 2024

(65) Prior Publication Data

US 2025/0220325 A1    Jul. 3, 2025

Related U.S. Application Data

(60) Provisional application No. 63/456,255, filed on Mar. 31, 2023.

(51) Int. Cl.
*H04Q 11/00* (2006.01)
*G06N 5/04* (2023.01)

(52) U.S. Cl.
CPC .......... *H04Q 11/0005* (2013.01); *G06N 5/04* (2013.01); *H04Q 2011/002* (2013.01); *H04Q 2011/0047* (2013.01); *H04Q 2213/054* (2013.01)

(58) Field of Classification Search
CPC ......... H04Q 11/0005; H04Q 2011/002; H04Q 2011/0047; H04Q 2213/054; G06N 5/04

(Continued)

(56) References Cited

U.S. PATENT DOCUMENTS

| | | | | |
|---|---|---|---|---|
| 2018/0217328 A1* | 8/2018 | Heroux | .................. | G02B 6/125 |
| 2022/0045780 A1* | 2/2022 | Stojanovic | ......... | H04Q 11/0071 |
| 2022/0318610 A1* | 10/2022 | Seo | ........................ | G06F 9/3887 |

OTHER PUBLICATIONS

Li et al., "SPACX: Silicon Photonics-based Scalable Chiplet Accelerator for DNN Inference"; 2022; IEEE International Symposium on High-Performance Computer Architecture (HPCA) in South Korea; IEEE; 15 pages.

(Continued)

*Primary Examiner* — Dalzid E Singh
(74) *Attorney, Agent, or Firm* — BLANK ROME LLP

(57) ABSTRACT

A computer architecture has a global optical waveguide, a buffer having memory space having a memory hierarchy above main memory for temporary data storage. A transmitter transmits a first optical signal with a first plurality of optical wavelengths on the global optical waveguide, and a second optical signal with a second plurality of optical wavelengths on the global optical waveguide. A receiver receives a second optical signal with a third plurality of optical wavelengths from the global optical waveguide. One or more local optical waveguide(s) are coupled to the global optical waveguide to receive all of the first plurality of optical wavelengths and a unique wavelength of the second plurality of optical wavelengths and transmit a unique wavelength of the third plurality of optical wavelengths. A plurality of chiplets are coupled to one of one or more local optical waveguides, each of the plurality of chiplets have a plurality of processing elements each receiving one of the first plurality of optical wavelengths and one of the second plurality of optical wavelengths from the local optical waveguide and transmitting one of the third plurality of optical wavelengths to local optical waveguide.

13 Claims, 8 Drawing Sheets

(58) Field of Classification Search
USPC .......................................................... 398/45
See application file for complete search history.

(56) References Cited

OTHER PUBLICATIONS

Shao et al., "Simba: Scaling Deep-Learning Inference with Multi-Chip-Module-Based Architecture"; 2019; IEEE/ACM International Symposium on Microarchitecture (MICRO); Columbus, Ohio; 14 pages.

Li et al.; "Scaling Deep-Learning Inference with Chiplet-based Architecture and Photonic Interconnects"; 2021; 58th ACM/IEEE Design Automation Conference (DAC); 6 pages.

Thonnart et al.; "POPSTAR: a Robust Modular Optical NoC Architecture for Chiplet-based 3D Integrated Systems"; 2020; Design, Automation & Test in Europe Conference & Exhibition; Grenoble, France; 6 pages.

Li et al., "ASCEND: A Scalable and Energy-Efficient Deep Neural Network Accelerator With Photonic Interconnects", 2022; IEEE Transactions on Circuits and Systems-I: Regular Papers; vol. 69; No. 7; 12 pages.

Li et al., "A Silicon Photonic Multi-DNN Accelerator"; 2023; International Conference on Parallel Architectures and Compilation Techniques (PACT); 12 pages.

* cited by examiner

10
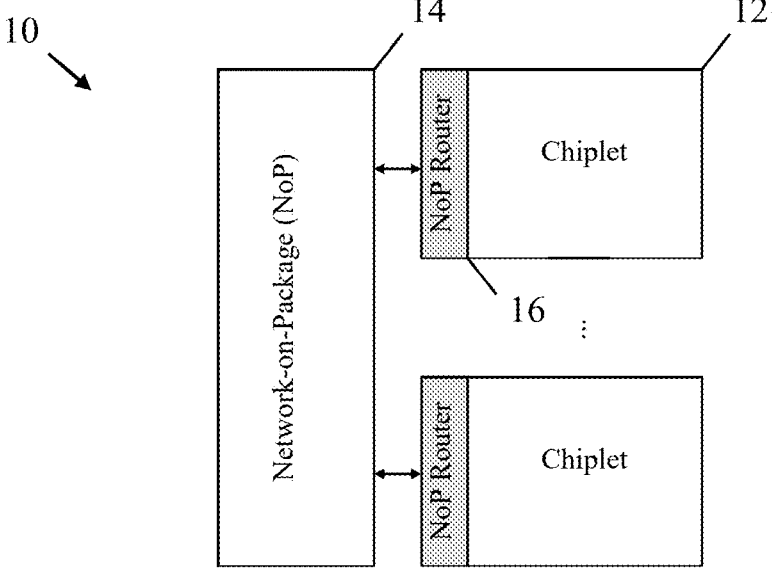
FIG. 1(a) - - PRIOR ART
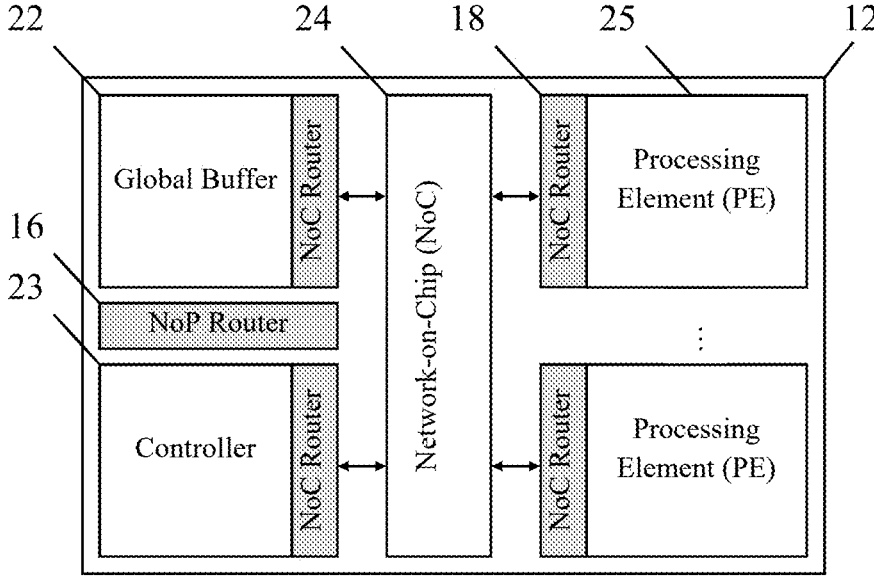
FIG. 1(b) - - PRIOR ART

SILICON PHOTONICS-BASED CHIPLET ACCELERATOR FOR DNN INFERENCE

RELATED APPLICATION

This is a continuation of and claims the benefit of priority of U.S. Application No. 63/456,255, filed Mar. 31, 2023, the content of which is relied upon and incorporated herein by reference in its entirety.

STATEMENT REGARDING FEDERALLY SPONSORED RESEARCH OR DEVELOPMENT

This invention was made with government support under grant nos. CCF1901165, CCF1702980, CCF1812495, and CCF1953980 awarded by the National Science Foundation (NSF). The government has certain rights in the invention.

BACKGROUND

Background of the Related Art

In pursuit of higher inference accuracy, deep neural network (DNN) models have significantly increased in complexity and size. To overcome the consequent computational challenges, scalable chiplet-based accelerators have been proposed. However, data communication using metallic-based interconnects in these chiplet-based DNN accelerators is becoming a primary obstacle to performance, energy efficiency, and scalability. The photonic interconnects can provide adequate data communication support due to some superior properties like low latency, high bandwidth and energy efficiency, and ease of multicast and broadcast communication.

Emerging DNN models often exhibit significant increase in model complexity and size for higher inference accuracy. Consequently, computing systems must scale in processing power, on-chip memory capacity, and data communication to efficiently process the large-scale DNN models. As the scaling of a monolithic chip slows down due to the stringent constraints of power density and fabrication cost, chiplet-based architectures have been recently proposed for scalable DNN inference applications. However, in chiplet-based DNN accelerators, data communication using metallic-based interconnects is posing a major obstacle to the performance, energy efficiency, and scalability. The fundamental limitations of the metallic-based interconnects, especially those spanning across chiplets, are (1) high latency and low bandwidth which inevitably lead to system performance degradation, (2) prominent latency discrepancy between single-chiplet and cross-chiplet communications which makes the orchestration of data communication imposed by parallel computing in DNN models challenging, and (3) excess energy of long distance communication frequently observed in chiplet-based architectures.

Photonic interconnects can potentially overcome the fundamental limitations of the metallic-based interconnects. Low-loss waveguides can distribute data to processing elements (PEs) in a single chiplet or across several chiplets without requiring multiple hops, maintaining low and uniform communication latency. Communication bandwidth can be increased by techniques such as wavelength-division multiplexing (WDM) and space-division multiplexing (SDM). Photonic interconnects have been shown to achieve high energy efficiency as the communication distance increases. More importantly, the salient ease of multicast and broadcast property of photonic interconnects makes them especially suitable to exploit the prevalent data reuse opportunities observed in DNN inference applications.

Prior photonic network designs for either on-chip or chiplet-based data communication often target communication in CPUs or GPUs, and exhibit equal bandwidth between arbitrary nodes. Several prior designs intentionally disable the multicast and broadcast capability of photonic interconnects. However, the highly regular and non-uniform communication in DNN inference applications makes the costly equal bandwidth allocation unnecessary. Prevalent multicast and broadcast communication in DNN inference applications cannot be adequately supported as well. In addition, previous DNN dataflows are designed for accelerators with only the metallic-based interconnects, as a result, optimized to consume more data in memory hierarchies closer to PEs. These dataflows do not promote data multicast or broadcast because such communication cannot be efficiently supported by underlying metallic-based interconnects. A dataflow tailored to photonic interconnects is necessary because (1) data communication distance is not a primary concern as in the previous dataflows, and (2) features uniquely related to photonic interconnects such as ease of multicast and broadcast communication shall be fully considered.

SUMMARY

SPACX: a silicon photonics-based chiplet accelerator for DNN inference applications. Specifically, SPACX includes a photonic network design that enables seamless single-chiplet and cross-chiplet multicast communications, and a tailored dataflow that promotes data multicast and maximizes parallelism.

These and other objects, as well as many of the intended advantages thereof, will become more readily apparent when reference is made to the following description, taken in conjunction with the accompanying drawings.

BRIEF DESCRIPTION OF THE FIGURES

FIG. 1(a) is a block diagram showing a conventional chiplet-based neural network computing architecture;

FIG. 1(b) illustrates the chiplet architecture in a conventional chiplet-based neural network computing architecture;

DETAILED DESCRIPTION

Figure 2A:
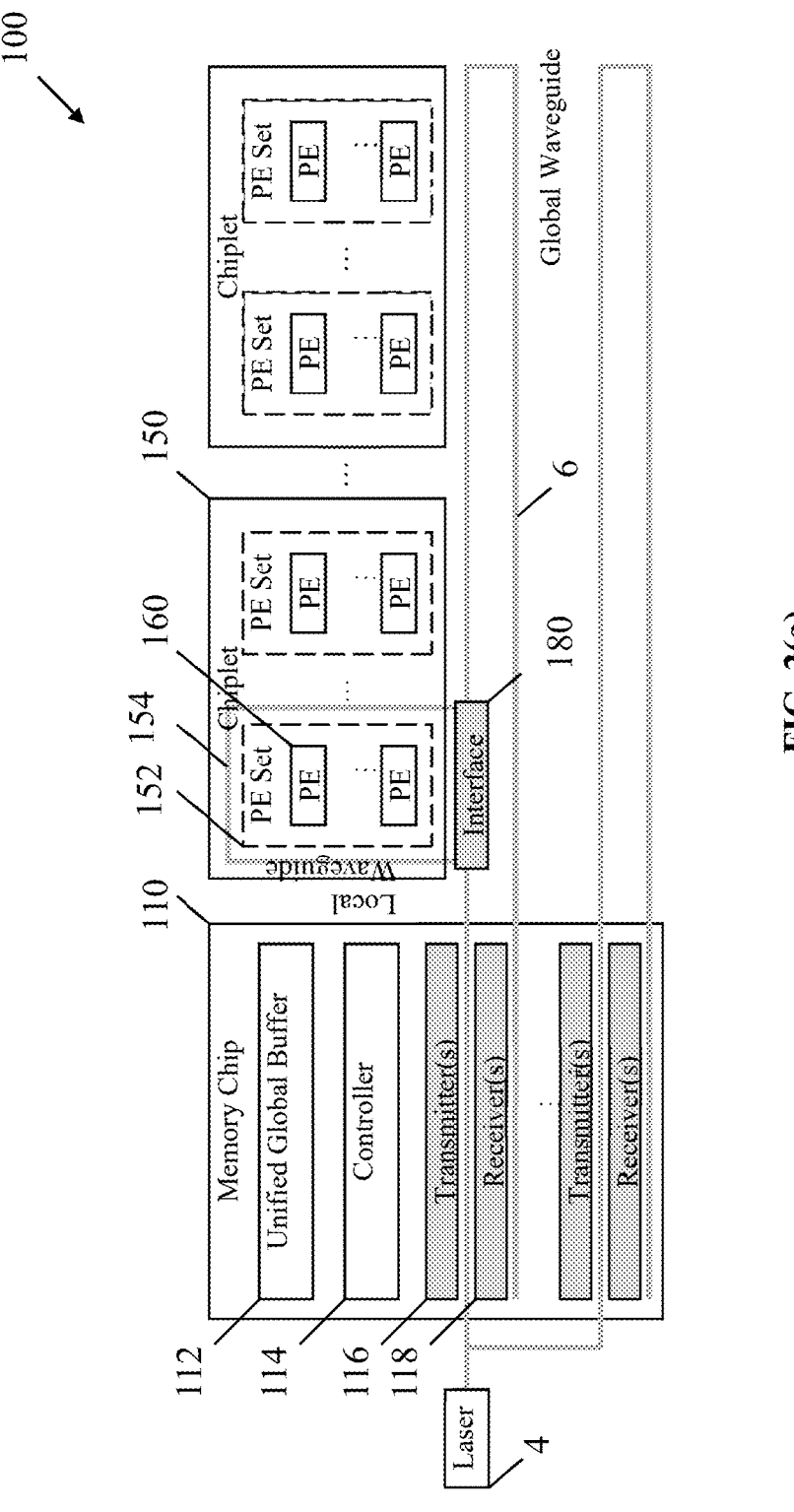
FIG. 2(a) is a block diagram that illustrates the SPACX computing architecture in accordance with the present disclosure.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

FIG. 1(a) illustrates a conventional chiplet-based neural network computing architecture 10. The architecture 10 has a plurality of chiplets 12, a Network-on-Package (NoP) 14, and a plurality of NoP Routers 16. Each chiplet 12 has an integrated NoP router 16. The NoP 14 is electronically connected (wired) to and in electronic communication with each chiplet 12 through the respective NoP router 16. The plurality of chiplets 12 are integrated in a single package and connected through the NoP 14 via the NoP router 16 attached to each chiplet 12. The NoP 14 is constructed with metallic-based interconnects. Each chiplet 12 includes one or more components to perform neural network computing. Each NoP router 16 is responsible for data exchange between the corresponding chiplet 12 and other chiplets 12 as well as lower memory hierarchy through the NoP 14. The NoP 14 is the communication network (constructed by metallic-based wires) between chiplets. It is used to connect the chiplets and possible lower memory hierarchy and support the communication between them.

FIG. 1(b) illustrates the chiplet 12 architecture in a conventional chiplet-based neural network computing architecture, such as the chiplet 12 used in FIG. 1(a). The chiplet 12 has one or more electronic components including the NoP router 16, a global buffer 22, a controller 23, and a plurality of PEs 25, each of which has a respective integrated NoC router 18 that connects the component to a Network-on-Chip (NoC) 24. The global buffer 22 temporarily stores input data required for neural network computing, as well as the generated intermediate and final data. The global buffer 22 communicates with global buffers 22 in other chiplets 12 as well as lower memory hierarchy through the NoP 14. The global buffer 22 also communicates with PEs 25 that reside on the same chiplet 12 through the NoC 24.

The controller 23 is responsible for configuring and managing the global buffer 22 and PEs 25 that reside on the same chiplet 12. The NoC 24 is constructed with metallic interconnects. Each PE 25 includes one or more components to perform neural network computing. Each NoC router 18 is responsible for data exchange between the corresponding component, either the global buffer 22, the controller 23, or a PE 25, and the rest of the chiplet 12 through the NoC 24.

During neural network computing, input data is fetched from lower memory hierarchy (e.g., off-chip DRAM) and temporarily stored in the global buffer 22 of each chiplet 12 through the NoP 14. On each chiplet 12, the input data is further coupled to the PEs 25 for neural network computing. The generated intermediate data is either temporarily stored in the PEs 25, sent back to the global buffer 22 through the NoC 24, or sent back to lower memory hierarchy through the NoP 14 for future reference. The generated final data is eventually sent back to lower memory hierarchy through the NoP 14. The neural network computing is completed following this process.

FIG. 2(a) illustrate one non-limiting example embodiment of the SPACX computing architecture, system, or apparatus 100. The SPACX system 100 includes a memory chip or device 110, a laser 4, one or a plurality of chiplets 150, and one or more global photonic waveguides 6. The memory chip 110 includes a unified global buffer 112, a controller 114, and one or more sets of transmitters 116 and receivers 118. The laser 4 is connected with the memory chip 110 and one or more chiplets 150 through one or more of the global waveguides 6. The chiplet 150 includes one or more PE sets 152, wherein each PE set 152 includes one or a plurality of PEs 160. The PE(s) 160 in a PE set 152 are connected to the global waveguide 6 through a local photonic waveguide 154 via an interface 180.

The global waveguide 6 extends between the laser 4, memory chip 110, and the one or more chiplets 150, and communicates data therebetween. A local waveguide 154 extends between a respective PE set 152 of the chiplet and communicates data between the PEs 160 of the PE set 152 and the global waveguide 6, via the interface 180.

Figures 2B, 2C:
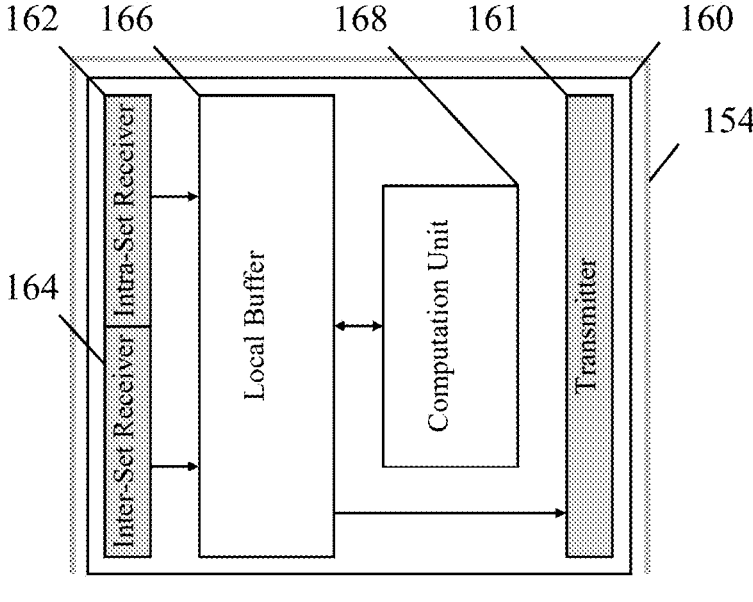
FIG. 2(b) illustrates the processing element (PE) architecture in the SPACX computing architecture of FIG. 2(a)
FIG. 2(c) illustrates the interface architecture in the SPACX computing architecture of FIG. 2(a)

FIG. 2(b) illustrates one non-limiting example embodiment of the SPACX PE 160 architecture. The PE 160 is equipped with an intra-set receiver 162 and an inter-set receiver 164 for receiving data from the corresponding local waveguide 154, as well as a transmitter 161 for sending data to the corresponding local waveguide 154. Data received from the intra-set receiver 162 and inter-set receiver 164 is stored in the local buffer 166 and then fed to a computation unit 168 for neural network computing. The intermediate data generated in the computation unit 168 is stored in the local buffer 166 or sent to the unified global buffer 112 (FIG. 2(a)) on the memory chip 110 or lower memory hierarchy, for future reference. The final data generated in the computation unit 168 is eventually sent back to the lower memory hierarchy. The intra-set receiver 162 and the inter-set receiver 164 each receive data carried by different wavelengths. In some embodiments, the intra-set receiver 162 receives data carried by one wavelength from the first wavelength set, which is used for intra-set multicast (e.g., communications from one PE 160 to another PE 160 within the same PE set 152). And, the inter-set receiver 164 receives data carried by one wavelength from the second wavelength set, which is used for inter-set multicast (e.g., from one PE 160 in a first PE set 152 to another PE in a second PE set 152).

FIG. 2(c) shows the interface 180 coupling the global waveguide 6 to a local waveguide 154. A plurality of MRRs are provided, each one coupling a respective unique one of the optical wavelength signals on the global waveguide 6 to the local waveguide 154.

Figure 2D:
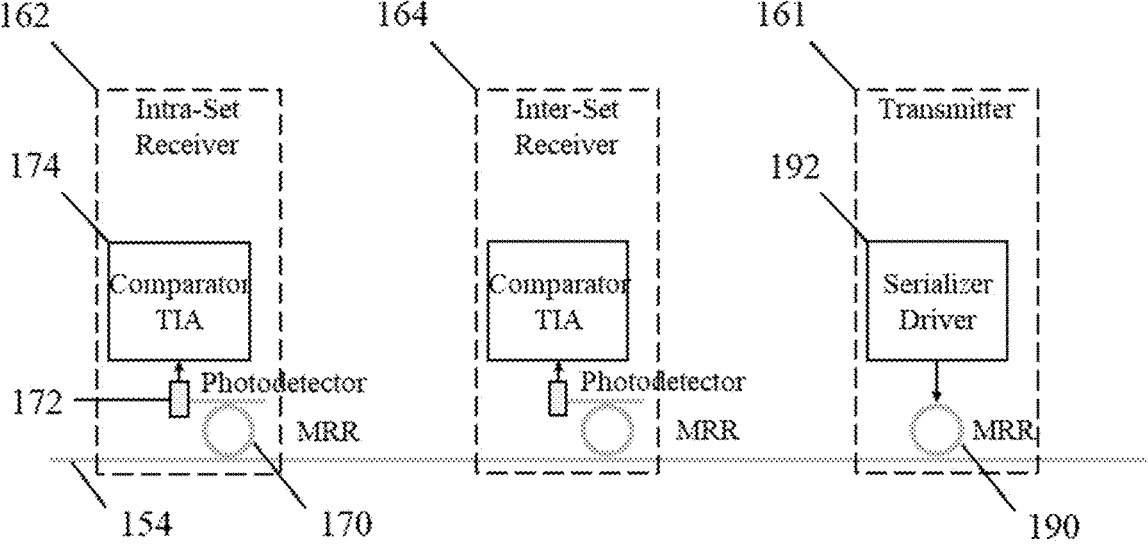
FIG. 2(d) shows details of the PE transmitters and receivers.

FIG. 2(d) shows detail of the intra-set and inter-set receivers 162, 164, and the transmitter 161 of the PE 160 of FIG. 2(b). The receivers 162, 164 include an MRR 170, photodetector 172, and peripheral circuit 174 including comparator and transimpedance amplifier (TIA). The MRR 170 is coupled to the local waveguide 154 and receives a unique optical wavelength signal from the local waveguide 154. The received signal is then sent to the photodetector 172, which converts the optical signal to a digital signal. The digital signal is then processed by the peripheral circuit 174, so it can be acted on by the PE, such as for example saved in the local buffer 166 and operated on by the computation unit 168. The transmitter 161 has a peripheral circuit 192 including serializer and driver and MRR 190. Referring to FIGS. 2(b), 2(d), a digital signal is from the local buffer 166 to the transmitter 161. The digital signal is processed by the peripheral circuit 192 and used to modulate a unique optical wavelength signal through MRR 190. It is further noted that the transmitters 116 and receivers 118 of the memory chip 110 have a similar structure as the transmitters 161 and receivers 162, 164 of FIG. 2(*d*), to transmit and receive optical wavelength signals to/from the global waveguide 6.

Figure 4:
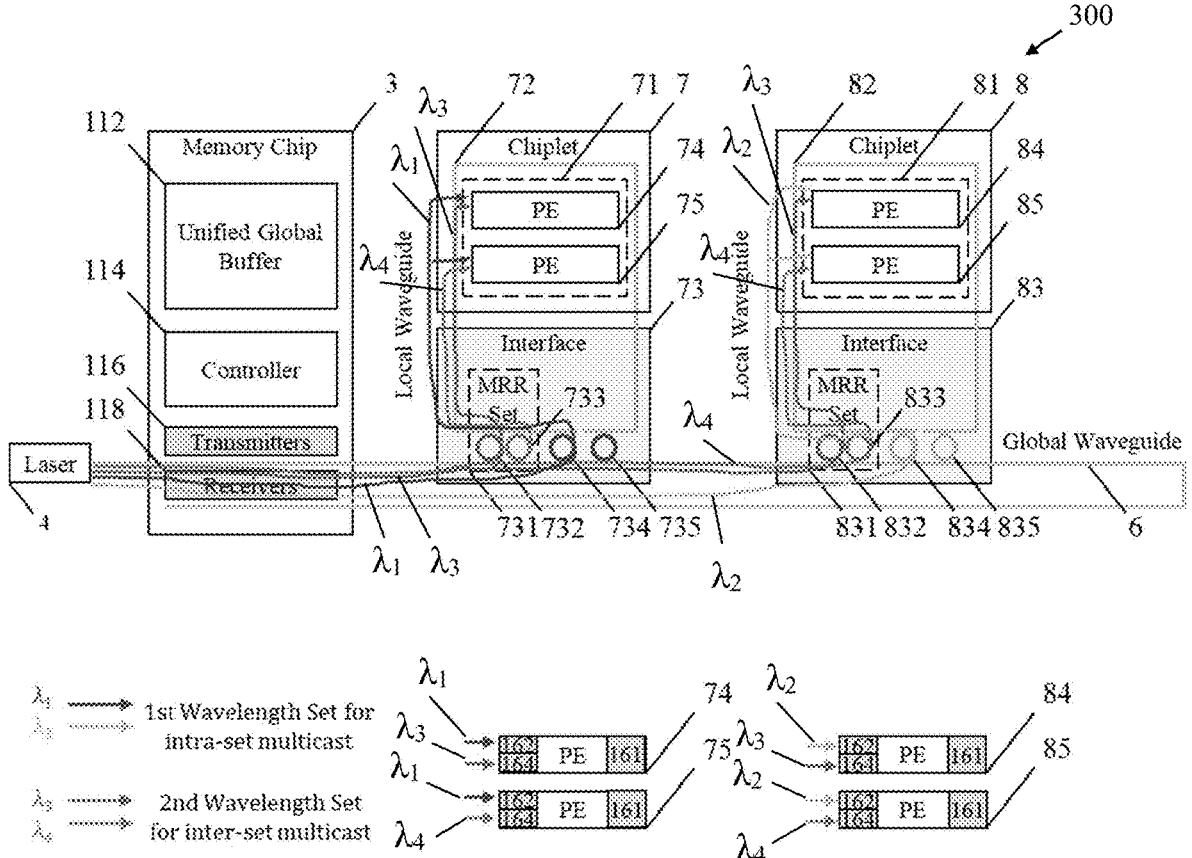
FIG. 4 shows optical signals being transmitted from the global buffer of a memory chip to the PE of a plurality of chiplets via global waveguide and a plurality or local waveguides.
Figure 5:
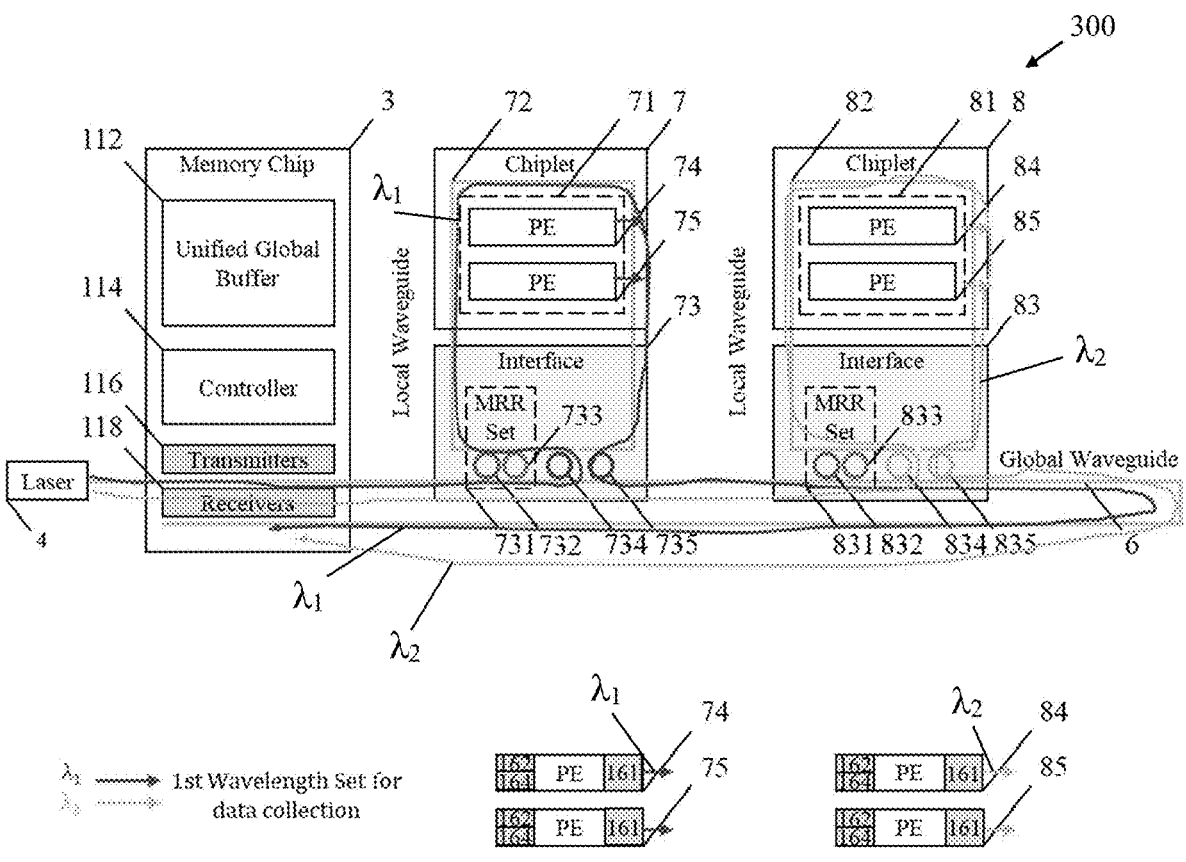
FIG. 5 shows optical signals being transmitted from the chiplets to the memory chip.

FIGS. 4-5 show an example for illustrative purpose, where FIG. 4 shows the system 300 operating in a transmitting mode (and the PEs operating in a receiving mode), and FIG. 5 shows the system 300 operating in a receiving mode (and the PEs operating in a transmitting mode). As shown, the number of wavelengths in the first wavelength set equals the maximum number of PE sets attached to a global waveguide (2 in this case), and here is shown as the first wavelength signal $\lambda_1$ (i.e., an optical signal having a first wavelength) and the second wavelength signal $\lambda_2$ (i.e., an optical signal having a second wavelength different from the first wavelength). The number of wavelengths in the second wavelength set equals the number of PEs per PE set (2 in this case), and here is shown as the third wavelength signal $\lambda_3$ and the fourth wavelength signal $\lambda_4$ (i.e., optical signals having third and fourth wavelengths).

FIG. 4 illustrates the system 300 operating in a transmitting mode, and the PEs operating in a receiving mode, wherein the memory chip transmits data from the unified global buffer 112, by the transmitters 116, to the unified global buffer 112, and then to all four PEs 74, 75, 84, 85, where they can be stored, for example at the local buffer 166 (FIG. 2(*b*)). All of the wavelength signals are generated from the laser and modulated (to carry data) through the transmitters 116 on the memory chip, including the first wavelength signal $\lambda_1$, the second wavelength signal $\lambda_2$, the third wavelength signal $\lambda_3$, and the fourth wavelength signal $\lambda4$.

The first and second interfaces 73, 83 each connect a respective first and second local waveguide 72, 82 to the global waveguide 6. A plurality of microrings (MRR) are provided, each one configured to couple a unique wavelength signal from the global waveguide 6 to the local waveguides 72, 82, and/or from the local waveguides 72, 82 to the global waveguide 6. The first interface 73 has a first MRR set (182 in FIG. 2(*c*)) which includes one or more MRRs (184 in FIG. 2(*c*)), a second separate MRR (186 in FIG. 2(*c*)) and another separate third MRR (188 in FIG. 2(*c*)). In the example of FIG. 4, the first and second MRR sets 731, 831 are used to evenly distribute the power of the third and fourth wavelength signals $\lambda_3$, $\lambda_4$ of the second wavelength set to PE sets 71 and 81. Accordingly, in the embodiment of FIG. 4, the third wavelength signal is transmitted to the two PEs (the first and third PEs 74, 84), so that each of the first and third PEs 74, 84 receive half of the power of the third wavelength signal. And, the fourth wavelength signal is transmitted to the second and fourth PEs 75, 85, which each get half of the power of the fourth wavelength signal.

Each of the third and fourth wavelength signals $\lambda_3$, $\lambda_4$ of the second wavelength set is coupled to the inter-set receiver 164 (FIG. 2(*b*)) of the respective PE. Thus, for the first PE set 71, a first MRR 732 a first MRR set 731 couples the third wavelength signal $\lambda_3$ to the local waveguide 72 and the receiver 164 at the first PE 74 receives that third wavelength signal. It is noted that the inter-set receiver 164 at the second PE is not tuned to the third wavelength, and so does not absorb the third wavelength signal. A second MRR 733 of the first MRR set 731 couples the fourth wavelength signal $\lambda_4$ to the local waveguide 72, and the inter-set receiver 164 of the second PE 75 receives that fourth wavelength signal. It is noted that the inter-set receiver 164 at the first PE is not tuned to the fourth wavelength, and so does not absorb the third wavelength signal. For the second PE set 81, a fifth MRR 832 of a second MRR set 831 couples the third wavelength signal $\lambda_3$ to the local waveguide 82, and the inter-set receiver 164 at the third PE 84 receives the third wavelength signal, and a sixth MRR 833 of the second MRR set 831 couples the fourth wavelength signal $\lambda_4$ to the local waveguide 82 and the inter-set receiver 164 at the fourth PE 84 receives the fourth wavelength signal.

The first and second wavelength signals are each transmitted to a single PE set 71, 81, respectively. Accordingly, the separate MRRs 734, couple all the power of one wavelength of the first wavelength set to the respective PE sets. In the example of FIG. 4, the third MRR 734 couples all of the power of the first wavelength signal $\lambda_1$ from the global waveguide 6 to the first local waveguide 72, and the seventh MRR 834 couples all of the power of the second wavelength signal $\lambda_2$ to the second local waveguide 82. The coupled wavelengths are then evenly distributed to the PEs of the same PE set and received by the intra-set receivers 162 (FIG. 2(*b*)). Thus, the intra-set receiver 162 of the first PE 74 couples half the power of the first wavelength signal $\lambda_1$ to the first PE 74, and the intra-set receiver 162 of the second PE 75 in the first PE set 71 couples half the power of the first wavelength signal to the second PE 75. And, the seventh MRR 834 couples all of the power of the second wavelength signal $\lambda_2$ from the global waveguide 6 to the second local waveguide 82. The intra-set receiver 162 of the third PE 84 couples half the power of the second wavelength signal $\lambda_2$ to the third PE 84, and the intra-set receiver 162 of the fourth PE 85 in the second PE set 81 couples half the power of the first wavelength signal to the fourth PE 85. Thus, the intra-set receiver 164 of each PE set receives the same wavelength signal of the first wavelength set (e.g., the first and second PEs 74, 75 receive the first wavelength signal; and the third and fourth PEs 84, 85 receive the second wavelength signal), and the inter-set receivers 164 receive different ones of the second wavelength set (e.g., the first and third PEs 74, 84 receives the first wavelength signal; and the second and fourth PEs 75, 85 receive the second wavelength signal.

FIG. 5 shows the PEs operating in a transmitting mode, where data is collected by the memory chip 110 from the PEs 74, 75, 84, 85 (e.g., from the PE buffer 166). When collecting data from the PEs to the unified global buffer 6, all four wavelengths are generated from the laser but only the first and second wavelengths $\lambda_1$, $\lambda_2$ from the first wavelength set are utilized. It is noted that the data is transmitted from the PEs on the first and second wavelengths (FIG. 5, the PE transmit mode/system receive mode), which is the same wavelengths that are used in the PE receive mode/system transmit mode (FIG. 4). This allows the same MRRs 734, 834 to be reused; that is, the same MRRs 734, 834 are used during the system transmit mode/PE receive mode to couple the first and second wavelength signals from the global waveguide 6 to the local waveguides 72, 82, respectively, and also during the system receive mode/PE transmit mode to couple the first and second wavelength signals from the local waveguides 72, 82 to the global waveguide 6.

The transmitters 116 on the memory chip are turned off so the first and second wavelength signals are left unmodulated. Instead, the laser signal 4 sends an unmodulated signal so that the PEs can couple the first and second wavelength signals onto the global waveguide 6 (via the local waveguides 71, 82). As shown in FIG. 5, the first wavelength signal 2 is coupled from the first and second PEs 74, 75 of the first PE set 71 through the respective transmitters 161, to the local waveguide 72, then through the third MRR 734 to the global waveguide 6. And, the second wavelength signal $\lambda_2$ is coupled from the third and fourth PEs 84, 85 of the second PE set 82 through the respective transmitters 161 to the local waveguide 82, then through the seventh MRR 834 to the global waveguide 6. At any given time, one PE from a PE set modulates the respective wavelength (to carry data) using its own transmitter (161 in FIG. 2(*b*)).

In FIG. 5, the transmitters 161 of the first and second PEs 74, PE 75 modulate the first wavelength signal $\lambda_1$ at different time slots, and the transmitters 161 of the third and fourth PEs 84, 85 modulate the second wavelength signal $\lambda_2$ at different time slots. But the first PE 74 and the third PE 84 can modulate the first and second wavelength signals $\lambda_1$, $\lambda_2$, respectively, at the same time. The modulated wavelength is then coupled to the global waveguide 6 and eventually received by the receivers 118 on the memory chip 3. The first wavelength signal $\lambda_1$ is coupled to the global waveguide 6 through the fourth MRR 735, the second wavelength signal $\lambda_2$ is coupled to the global waveguide through the eighth MRR 835.

FIG. 2(*c*) illustrates the interface 180 architecture in accordance with a non-limiting example embodiment of the disclosure. The interface 180 connects the local waveguide 154 to the global waveguide 6 by a microring resonator (MRR) set 182, a separate MRR 186, and another separate MRR 188. Here, in the example embodiment shown, the MRR set 182 has one or more separate MRRs 184. The number of MRR(s) 184 in the MRR set 182 equals the number of PE(s) 160 in the PE set 152. A separate interface 180 is provided for each local waveguide 154, and here a separate local waveguide 154 is provided for each PE set 152. Each PE set has a unique local waveguide which is connected to a global waveguide through a unique interface.

In operation, referring initially to FIG. 2(*a*), the laser 4 feeds a light signal, for example one or more unmodulated light wavelengths, to the global waveguide(s) 6. The wavelength(s) from the laser 4 are grouped into two sets, namely a first wavelength set and a second wavelength set.

Each wavelength in the first wavelength set is used to send data from the unified global buffer 112 to all the PE(s) 160 in a respective single PE set 152. Each wavelength in the first wavelength set is also used to collect data from the PE(s) 160 in a single PE set 152 to the unified global buffer 112. The number of wavelength(s) in the first wavelength set equals the maximum number of PE set(s) 152 connected to a single global waveguide 6.

Thus, for example, a first wavelength in the first wavelength set transmits data from the unified global buffer 112 to all PE(s) in a first PE set 152; and that first wavelength is also used to transmit data from the PE(s) in the first PE set 152 to the unified global buffer 112. In addition, a second wavelength in the first wavelength set transmits data from the unified global buffer 112 to all PE(s) in a second PE set 152; and that second wavelength is also used to transmit data from the (PEs) in the second PE set 152 to the unified global buffer 112. (Or we can use the example shown in FIG. 3. Thus, for example, in FIG. 3, a first wavelength in the first wavelength set transmits data from the unified global buffer 112 to PE 74 and PE 75 in PE set 71; and that first wavelength is also used to transmit data from PE 74 and PE 75 in PE set 71 to the unified global buffer 112. In addition, a second wavelength in the first wavelength set transmits data from the unified global buffer 112 to PE 84 and PE 85 in PE set 81; and that second wavelength is also used to transmit data from PE 74 and PE 75 in PE set 71 to the unified global buffer 112.

FIGS. 2(*a*), 6(*a*), 6(*b*) further illustrate that in some embodiments, the wavelengths generated by the laser 4 can be split amongst the plurality of global waveguides 6. Still further embodiments are shown in Table 1 below, and FIG. 6(*a*) illustrates to configuration B and FIG. 6(*b*) illustrates configuration C.

TABLE 1

| Configuration | A | B | C | D |
|---|---|---|---|---|
| No. of global waveguide | 1 | 2 | 2 | 4 |
| No. of local waveguide per chiplet | 1 | 1 | 2 | 2 |
| No. of wavelengths | 16 | 12 | 12 | 8 |
| No. of PEs per waveguide | 64 | 32 | 32 | 16 |
| No. of MRRs in interfaces | 80 | 80 | 96 | 96 |

Figure 6A:
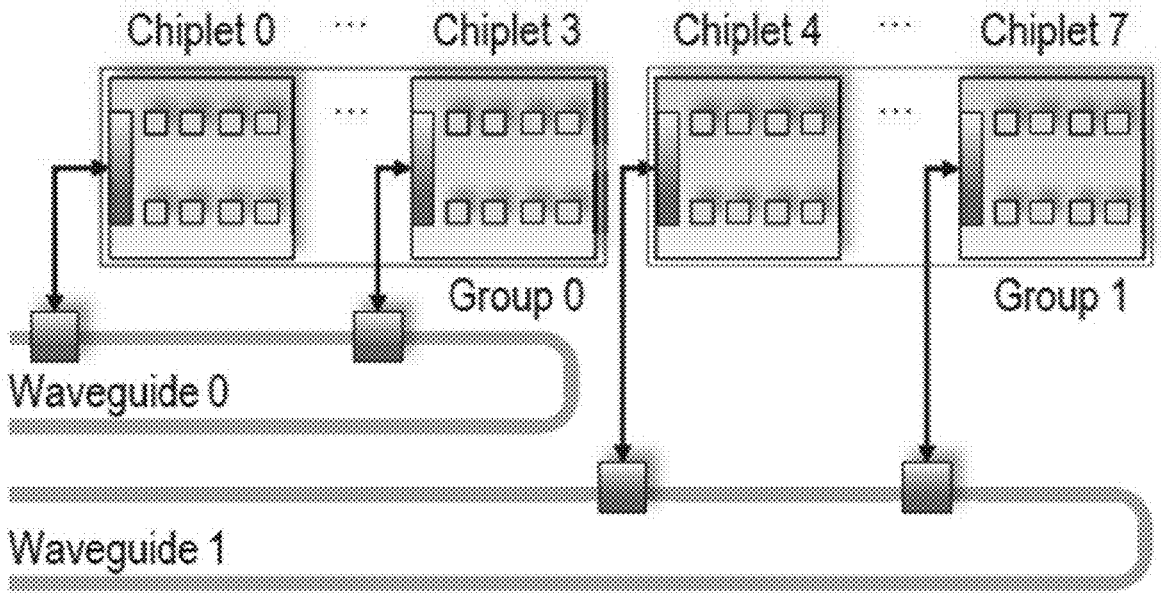
FIG. 6(a) shows another embodiment of the system having two global waveguides.
Figure 6B:
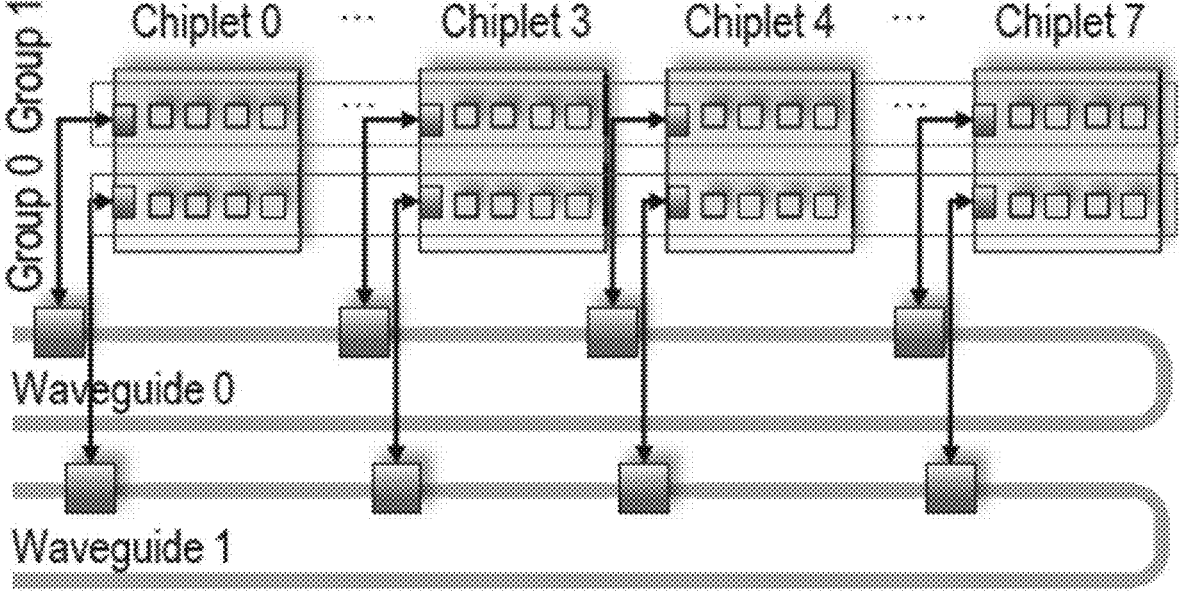
FIG. 6(b) shows another embodiment of the system having two global waveguides and two local waveguides per chiplet.

FIG. 6(*a*) shows that to realize independent single-chiplet broadcast communication in each group, one additional global waveguide and one additional local waveguide on each chiplet are implemented. Implementing multiple cross-chiplet and single-chiplet broadcast groups enables fine-grained mapping of DNN layers with diverse layer parameters on the SPACX architecture, potentially increasing PE utilization. Furthermore, this approach has implications on system scalability and energy efficiency of data communication. Table 1 lists four SPACX photonic network configurations corresponding to different broadcast granularities. Configuration A is the original SPACX photonic network architecture. Configurations B (FIG. 6(*a*)) and C (FIG. 6(*b*)) are architectures with finer cross-chiplet and single-chiplet broadcast granularities, respectively. Configuration D simultaneously achieves fine cross-chiplet and single-chiplet broadcast granularities. Configuration D, which can be considered as the combination of configurations B and C, only exhibits moderate increase in implementation cost (the number of required MRRs). This is because the number of interposer interfaces per chiplet increases to 2 while the number of MRRs on each interposer interface decreases to 6 (4 optical tunable splitters and 2 optical filters). Enabling fine broadcast granularity as in configuration D incurs significant decrease in required laser power at the cost of moderate increase in the overall MRR power. This is one way the energy efficiency of data communication in the SPACX architecture is improved.

Each wavelength in the second wavelength set is used to send data from the unified global buffer 112 to the corresponding PE(s) 160 in PE set(s) 152 connected to the same global waveguide 6. The number of wavelength(s) in the second wavelength set equals the number of PE(s) 160 in a single PE set 152. Each wavelength in the first set is connected to all PEs in a PE set for data distribution and collection. Each wavelength in the second set is connected to one respective PE of each PE set connected to the same global waveguide.

Each transmitter 116 can only modulate a certain wavelength. As there might be multiple wavelengths in the union of the first and second wavelength sets for data distribution, more than one transmitter can be included in a set of transmitters. Each set of transmitter(s) 116 on the memory chip 110 is attached to the global waveguide 6. The number of transmitter(s) 116 equals the sum of the numbers of non-overlapping wavelengths in the first and second wavelength sets. For sending data from the unified global buffer 112 on the memory chip 110 to PE set(s) 152 connected to the global waveguide 6, each transmitter 116 modulates a specific wavelength to carry data from the unified global buffer 112 on the memory chip 110. The modulated wavelengths are then transmitted along the global waveguide 6.

Referring to FIGS. 2(*a*), (*c*), at the interface 180, each MRR 184 in the MRR set 182 couples a fraction of the power of a specific wavelength belonging to the second wavelength set to the corresponding local waveguide 154. The fraction is inversely proportional to the number of PE set(s) 152 connected to the global waveguide 6 so that the power of each wavelength belonging to the second wavelength set is evenly distributed among PE set(s) 152 connected to the global waveguide 6. The number of MRR(s) 184 in the MRR set 182 equals the number of wavelength(s) of the second wavelength set.

The inter-set receiver 164 of each PE 160 in a PE set 152 receives data carried by a specific wavelength belonging to the second wavelength set. The inter-set receiver(s) 164 of the respective PE(s) 160 in PE set(s) 152 connected to the global waveguide 6 receive the same data carried by a specific wavelength belonging to the second wavelength set. That is, the inter-set receiver(s) 164 of PE(s) 160 in a PE set 152 receive data from different wavelengths belonging to the second wavelength set. Hence, PE(s) 160 in a PE set 152 receive different data. However, PE(s) 160 which reside in different PE set(s) 152 connected to the same global waveguide 6 but receive data from the same wavelength belonging to the second wavelength set, will receive the same data (inter-set multicast).

A separate MRR 186 couples all the power of a specific wavelength belonging to the first wavelength set to the corresponding local waveguide 154. The power of this wavelength is then evenly distributed among PE(s) 160 in the corresponding PE set 152. The intra-set receiver 162 of each PE 160 in the corresponding PE set 152 receives the same data carried by this wavelength belonging to the first wavelength set. Use one wavelength from the first wavelength set to achieve intra-set data multicast of a specific PE set.

Each receiver works on a specific wavelength belonging to the first wavelength set. Since there might be multiple wavelengths in the first wavelength set, more than one receiver can be included in a receiver set. Each set of receiver(s) 118 on the memory chip 110 is attached to a global waveguide 6. The number of receiver(s) 118 equals the number of wavelength(s) in the first wavelength set. For collecting data from PE set(s) 152 connected to the global waveguide 6 to the unified global buffer 112 on the memory chip 110, the transmitter(s) 116 attached to the global waveguide 6 are deactivated, coupling unmodulated wavelengths along the global waveguide 6. An unmodulated wavelength generated by the laser 4 is a continuous signal. The function of a transmitter is to embed the data to the wavelength, by using the data in the digital form (a series of 1s and 0s) as the control signal to couple and cut off the light, known as modulation. The modulated wavelength becomes a discontinuous signal and can be retrieved to 1s and 0s at a receiver. Here, the transmitters are deactivated, and the unmodulated wavelengths (carrying no data) are coupled along the global waveguide.

At the interface 180, a separate MRR 186 couples all the power of a specific wavelength belonging to the first wavelength set to the corresponding local waveguide 154. The transmitter 161 of a PE in the corresponding PE set 152 modulates this specific wavelength belonging to the first wavelength set to carry data from the local buffer 166. The transmitter(s) 161 of the PE(s) 160 in the corresponding PE set 152 modulate this specific wavelength belonging to the first wavelength in different time slot(s) to send data sequentially. All the power of this specific modulated wavelength belonging to the first wavelength set is coupled to the global waveguide 6 from the corresponding local waveguide 154 via a separate MRR 188. The data carried by this specific modulated wavelength belonging to the first wavelength set is eventually received by one specific receiver from the set of receiver(s) 118.

Wavelength(s) in the first wavelength set are utilized for sending data from the unified global buffer 112 to PE set(s) 152 and collecting data from PE set(s) 152 to the unified global buffer 112. However, the data sending and collecting operations cannot be performed simultaneously as the first wavelength set is utilized in both operation types. Furthermore, in the case of partial or complete overlap of wavelength(s) in the first and second wavelength sets, the operations of sending data from the unified global buffer 112 to the PE(s) 160 in each PE set 152 and sending data from the unified global buffer 112 to the corresponding PE(s) 160 in all PE set(s) 152 connected to the global waveguide 6 cannot be performed simultaneously. The controller 114 on the memory chip 110 is responsible for configuring and managing the unified global buffer 112 and the PE(s) 160 on all of the chiplet(s) 150. The controller 114 is also responsible for orchestrating data sending and collecting operations by configuring and managing the transmitter(s) 116 and receiver(s) 118 on the memory chip 110, the interface(s) 180, as well as the intra-set receiver 162, the inter-set receiver 164, and the transmitter 161 of each PE 160. Accordingly, the controller 114 controls the receivers and transmitters and MRRs so that they communicate at a specific desired wavelength and/or power and/or at a specific desired time.

As noted, the system is multicasting. As in FIGS. 3-5, the first PE 74 and the second PE 75 in the first PE set 71 are connected to the global waveguide 6 through local waveguide 72 via interface 73. The third PE 84 and the fourth PE 85 in the second PE set 81 are connected to the same global waveguide 6 through local waveguide 82 via interface 83. There are two wavelengths $\lambda_1$ and $\lambda_2$ in the first wavelength set as there two PE sets connected to global waveguide 6. There are also two wavelengths, third and fourth wavelength signals $\lambda_3$, $\lambda_4$, in the second wavelength set as there are two PEs per PE set. We assume there is no overlap of wavelengths between the first and second wavelength sets. The first wavelength $\lambda_1$ is used to send the same data to the first and second PEs 74, 75 in the PE set 71, hence, achieving intra-set multicast. Similarly, the second wavelength signal $\lambda_2$ is used to send data to the third and fourth PEs 84, 85 in the second PE set 81. The third wavelength signal $\lambda_3$ is used to send the same data to the first PE 74 in the PE set 71 and the third PE 84 in the second PE set 81, hence, achieving inter-set multicast. Similarly, the fourth wavelength signal $\lambda_4$ is used to send the same data to PE 75 in PE set 71 and PE 85 in PE set 81.

Figure 3:
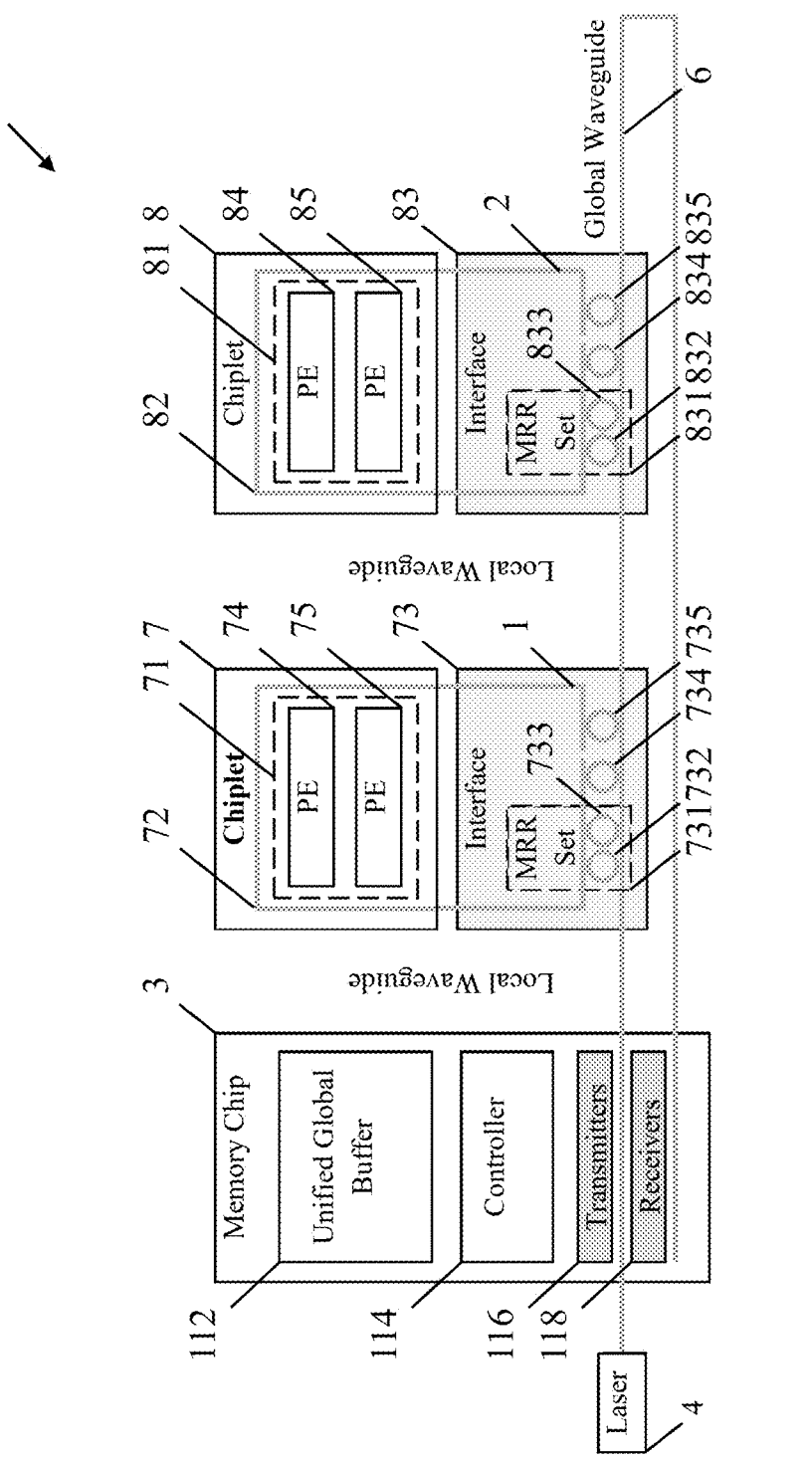
FIG. 3 illustrates the SPACX computing architecture of a specific setup.

FIG. 3 illustrates a non-limiting example of a SPACX computing architecture or system 300. In this system 300, a first chiplet 7 has a first PE set 71 with a first PE 71 and a second PE 75, as well as a first local waveguide 72. A second chiplet 8 has a second PE set 72 with a third PE 84 and a fourth PE 85, as well as a second local waveguide 82. The first and second PEs 74, 75, and the third and fourth PEs 84, 85 form a two-by-two PE array having two rows (a first row formed by the first PE 74 and the third PE 84; and a second row formed by the second PE 75 and the fourth PE 85) and two columns (a first column formed by the first and second PEs 74, 75; and a second column formed by the third and fourth PEs 84, 85).

The first wavelength set includes two wavelengths, a first wavelength $\lambda_1$ and a second wavelength $\lambda_2$, while the second wavelength set also includes two wavelengths, a third wavelength $\lambda_3$ and a fourth wavelength $\lambda_4$. The first wavelength $\lambda_1$ is used for multicasting data from the unified global buffer 112 on the memory chip 110 among the first PE 74 and the second PE 75 of the first PE set 71. The second wavelength $\lambda_2$ is used for multicasting data from the unified global buffer 112 on the memory chip 110 among the third PE 84 and the fourth PE 85 of the second PE set 81. The third wavelength $\lambda_3$ is used for multicast data from the unified global buffer 112 on the memory chip 110 among the first PE 74 of the first PE set 71 and the third PE 84 of the second PE set 81. The fourth wavelength $\lambda_4$ is used for multicast data from the unified global buffer 112 on the memory chip 110 among the second PE 75 of the first PE set 71 and the fourth PE 85 of the second PE set 81.

In the case of sending data from the unified global buffer 112 to PE(s) 160, in interface 73, the first MRR 732 in MRR set 731 couples one-half of the power of the third wavelength $\lambda_3$ to the local waveguide 72 and eventually to the inter-set receiver 164 of PE 74. The second MRR 733 in MRR set 731 couples one-half of the power of wavelength $\lambda_4$ to local waveguide 72 and eventually to the inter-set receiver 164 of PE 75. Meanwhile, in interface 83, the first MRR 832 in MRR set 831 couples all remained power of wavelength $\lambda_3$ to local waveguide 82 and eventually to the inter-set receiver 164 of PE 84. The second MRR 833 in MRR set 831 couples all remained power of wavelength $\lambda_4$ to local waveguide 82 and eventually to the inter-set receiver 164 of PE 85. In this way, inter-set multicast is achieved.

At the first interface 73, the separate MRR 734 couples all the power of the first wavelength 2 to the local waveguide 72 and then evenly distributed to the intra-set receivers 162 of PE 74 and PE 75 in PE set 71. Meanwhile, at the second interface 83, the separate seventh MRR 834 couples all the power of wavelength $\lambda_2$ to local waveguide 82 and then evenly distributed to the intra-set receivers 162 of PE 84 and PE 85 in PE set 81. In this way, intra-set multicast is achieved.

In the case of collecting data from PE(s) 160 to the unified global buffer 112, in interface 73, all the power of the unmodulated wavelength A is coupled to local waveguide 72 via MRR 734. At any given time, the transmitter 161 of one of the two PEs, 74 and 75, modulates the wavelength and the power of the modulated wavelength is coupled to global waveguide 6 from the local waveguide 72 via MRR 735. In interface 83, all the power of the unmodulated wavelength $\lambda_2$ is coupled to local waveguide 82 via MRR 834. At any given time, the transmitter 161 of one of the two PEs, 84 and 85, modulates the wavelength and the power of the modulated wavelength is coupled to global waveguide 6 from the local waveguide 82 via MRR 835.

The local waveguide does start at the interface, loop around all PEs in a PE set, and end at the same interface. The reason of adopting a loop structure is that one wavelength from the first wavelength set is used for intra-set data distribution (local waveguide must start from the interface (data is coupled to the local waveguide from the global waveguide via the interface) and loop around all PEs in the PE set), as well as data collection (local waveguide must end at the interface to send the data collected from PEs back to the global waveguide and eventually to the unified global buffer).

To further illustrate the system, using FIG. 3 as an example, PATH 112→116→6→732 & 832→72 & 82→164 of 74 & 164 of 84→166 of 74 & 166 of 84→168 of 74 & 168 of 84: the data is originally stored in the unified global buffe 112 in the digital formats (e.g., 0x10000010), this data is serialized and used as the control signal at the transmitter 116. In presence of a 0x0, the transmitter will couple the wavelength $\lambda_3$ while in presence of a 0x1, the transmitter will cut off the transmission of that wavelength $\lambda_3$. After this modulation process, the original continuous optical wavelength becomes a discontinuous modulated wavelength. This wavelength is transmitted along the global waveguide 6. The MRR 732 will couple half of the power of this wavelength to local waveguide 72 while the remaining half will be coupled to local waveguide 82 via MRR 832. The inter-set receiver 164 of PE 72 can convert the discontinuous modulated wavelength back to the digital format (e.g., 0x10000010) and store it in the local buffer 166. The store data is then fed into the computation unit 168 for computation. Meanwhile, the inter-set receiver 164 of PE 82 can convert the discontinuous modulated wavelength back to the digital format (e.g., 0x10000010) and store it in the local buffer 166. The store data is then fed into the computation unit 168 for computation.

Another path is PATH 168→166→161→72→735→118→112: the data generated in the computation unit 168 (either intermediate data or final result) is stored back to the local buffer 166 in the digital format. In case the data needs to be sent to the unified global buffer 112, the transmitters 116 are deactivated (control signal is set to 0x0 to let the unmodulated wavelengths through). The unmodulated wavelength $\lambda_1$ is transmitted along the global waveguide 6 and then coupled to local waveguide 72 via MRR 734. The transmitter 161 of the PE will take the data stored in its local buffer as the control signal after serialization to modulate wavelength $\lambda_1$ on the local waveguide, so that the unmodulated wavelength A becomes a discontinuous modulated wavelength. The modulated wavelength $\lambda_1$ is then coupled back to the global waveguide 6 from the local waveguide 72 via MRR 735. The receiver 118 can convert the discontinuous modulated wavelength $\lambda_1$ back to the digital formats. The received data is then stored in the unified global buffer 112.

Hence, the present example illustrates that column-wise and row-wise multicast communications in the PE array are achieved by using the first and the second wavelength sets, respectively. Thus, the system can transmit first data to 74, 75, second data to PEs 84, 85, third data to PEs 74, 84, and fourth data to PEs 75, 85. Each PE will take two pieces of data for computation and every computation will take a different pair of two pieces of data. In other words, no two PEs will take the same pair of two pieces of data for computation because that two PEs will be repeating the same computation. If we transmit the same piece of data to 74, 75, 84, and 85, we can infer that the other piece of data taken by 74, 75, 84, and 85 would be different. Hence, we only do one multicast to 74, 75, 84, and 85, and four unicasts to each of them. If we are doing row-wise and column-wise multicast, we do two row-wise multicasts and another two column-wise multicasts. In this way, multicasts, which the photonic interconnects are very good at in terms of energy efficiency, are maximized while unicasts are avoided.

The prevalent multiply-accumulate operations in neural network computing includes two types of input data: weight and input feature, and one type of output data: output feature. Weights are multiplied with input features and the results are then accumulated and go through an activation function to generate output features. An output feature is generated by accumulating the multiplication results of several different weight and input feature pairs followed by a proper activation operation. The SPACX computing architecture 300 can, in one example, adopt a dataflow wherein each PE is responsible for the generation of a specific output feature. Furthermore, multiplications in each column of PEs in the PE array share the weights while multiplications in each row of PEs in the PE array share the input features, or vice versa.

The SPACX system 100, 300 includes a new photonic network and corresponding dataflow co-optimized for DNN inference applications. Multiple broadcast granularities are enabled by different configurations of the photonic network and their implications on system performance and energy efficiency. A flexible bandwidth allocation scheme is developed to dynamically adjust communication bandwidths for different types of data based on DNN layer parameter information. Simulation studies with several DNN models show that SPACX can achieve 78% and 75% reduction in execution time and energy, respectively, as compared to other state-of-the-art chiplet-based DNN accelerators with either metallic-based or photonic interconnects.

In FIG. 1, communication between PEs in different chiplets need to go through the local NoC, the NoP, and the NoC on the destination chiplet. As both NoC and NoP are constructed by metallic-based interconnects, the communication may incur severe delay due to multiple hops required on NoC and NoP. In FIGS. 2-5, communication between any pair of source and destination can be done in one hop, as photonic interconnects exhibit distance-independent latency property. The major energy consumed by a photonic interconnect is at the transmitter and receiver ends. By using multicast or broadcast, only one transmitter is required instead of several. As a result, the energy consumed by transmitters can be reduced.

Thus, the system 100, 300 provides a Photonic Network Design. The hierarchical photonic network seamlessly extends the connection between the global buffer (GB) and chiplets to PEs, enabling one-hop data communication from the GB to arbitrary PEs. The photonic network adequately supports orthogonal single-chiplet (from the GB to all PEs on a single chiplet) and cross-chiplet (from the GB to specific PEs on all chiplets) broadcast communications.

The system 100, 300 also provides a broadcast-enabled output-stationary dataflow. The proposed dataflow enforces single-chiplet and cross chiplet broadcast of input features and weights by spatially allocating computations with shared input features and weights to PEs on a chiplet and corresponding PEs on all chiplets, respectively. Such allocation exploits the orthogonal broadcast capability of the proposed photonic network to obtain high data parallelism and high energy efficiency of data communication. Furthermore, output stationary nature of the developed dataflow significantly reduces intermediate data exchange between PEs which incurs excessive electrical-to-optical (E/O) and optical to electrical (O/E) signal conversions.

The system also has a flexible bandwidth allocation scheme. This scheme adjusts the communication bandwidth by tuning the numbers of wavelengths for different types of data, based on DNN layer and system parameters obtained offline. This scheme helps improve network utilization and reduce PE stalls.

WDM means multiplexing several wavelengths on a single waveguide. We have utilized this technique in the design as one global waveguide 6 is carrying multiple wavelengths (two wavelength sets). Accelerator refers to the specialized PE 25, NoC 24, global buffer 22 and NoP 14 customized for a specific application or a cluster of applications. In this case, the DNN inference applications. This system is especially suitable for DNN inference because DNN inference applications require a large-scale system with very high computation capacity. Usually within a system at such a scale, the communication aspect supported by metallic-based interconnects become the bottleneck. But photonic interconnects can provide adequate communication support. Besides, DNN inference applications involve prevalent data reuse opportunities, meaning that each piece of data is reused by many computations. If these computations are performed in parallel in different spatial locations, that piece of data needs to be multicast or broadcast to these locations, which can be done very efficiently by photonic interconnects. The major advantage of high parallelism is reducing the overall processing time as the same workload is distributed to several computation locations working in parallel and each computation location is only responsible for a share of the overall workload.

It is noted that one example embodiment of the system 100, 300 is for DNN and inference models. However, the system 100, 300 can be utilized for other applications. The system 100, 300 connects chiplets embedded with processing elements with the hierarchical network to construct a scalable architecture for deep learning acceleration. It further divides multiplexed wavelengths into two groups: the first group is for input data transmission to the processing elements while the second group is for output data collection from the processing elements. The system also logically arranges the processing elements in a 2D array (processing elements on the same chiplet constitute a row while processing elements on different chiplets constitute different rows in the 2D array), and simultaneously multicasting input data to processing elements belonging to the same rows or columns.

The dataflow ensures that computations in the PEs of the same row or column share the same input data. Hence, multicast to the rows and columns are necessary. It is preferred that they can be done simultaneously using the first and second wavelength sets. But it is possible that there is a partial or complete overlap of wavelengths in these two sets. For example, we can assume that both sets have the same wavelengths. In this case, row-wise and column-wise multicast can only be done sequentially, which degrades the PE performance, as each PE cannot obtain the input data required in time.

It is noted that the system uses a microring MRR. However, any suitable coupling device can be utilized, within the spirit and scope of the present disclosure. In addition, while silicon is one material, other suitable materials can be utilized. And, while specific communication configuration is shown and described with respect to FIGS. 4, 5, any suitable configuration can be utilized within the spirit and scope of the present disclosure, including any number of wavelength sets, wavelength signals, and connections between PEs and wavelength signals.

It is further noted that the drawings may illustrate and the description and claims may use several geometric or relational terms and directional or positioning terms, such as rows and columns. Those terms are merely for convenience to facilitate the description based on the embodiments shown in the figures, and are not intended to limit the disclosure. Thus, it should be recognized that the disclosure can be described in other ways without those geometric, relational, directional or positioning terms. In addition, the geometric or relational terms may not be exact. And, other suitable geometries and relationships can be provided without departing from the spirit and scope of the disclosure.

Accordingly, the entire operation is conducted automatically by the processor, and without any manual interaction. Unless indicated otherwise, the process can occur substantially in real-time without any delay or manual action. In addition, the system operates dynamically; for example, the various PEs continually receive data and transmit information.

In the embodiment of FIGS. 2, 3, the controller 116 and/or computation unit 168 can include a processing device to perform various functions and operations in accordance with the disclosure. The processing device can be, for instance, a computer, personal computer (PC), server or mainframe computer, or more generally a computing device, processor, application specific integrated circuits (ASIC), or controller. The processing device can be provided with, or be in communication with, one or more of a wide variety of components or subsystems including, for example, a co-processor, register, data processing devices and subsystems, wired or wireless communication links, user-actuated (e.g., voice or touch actuated) input devices (such as touch screen, keyboard, mouse) for user control or input, monitors for displaying information to the user, and/or storage device(s) such as memory, RAM, ROM, DVD, CD-ROM, analog or digital memory, flash drive, database, computer-readable media, floppy drives/disks, and/or hard drive/disks. All or parts of the system, processes, and/or data utilized in the system of the disclosure can be stored on or read from the storage device(s). The storage device(s) can have stored thereon machine executable instructions for performing the processes of the disclosure. The processing device can execute software that can be stored on the storage device. Unless indicated otherwise, the process is preferably implemented automatically by the processor substantially in real time without delay.

The operation of the processing device(s) is implemented by computer software that permits the accessing of data from an electronic information source. The software and the information in accordance with the disclosure may be within a single, free-standing computer or it may be in a central computer networked to a group of other computers or other electronic devices. The information may be stored on a computer hard drive, on a CD ROM disk or on any other appropriate data storage device. The system can also be implemented on the cloud and comprise a cloud computing system which provide access via the Internet to shared computing resources, such as servers, storage devices, networks, and/or applications on demand or in real time without regard to the location of those resources.

The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A computer architecture comprising:
    one or more global waveguide(s);
    a unified global buffer having memory space for temporary data storage;
    a plurality of sets of transmitters each of said set of transmitters associated with each of said one or more global waveguides, said set of transmitters having a first plurality of transmitters each configured to transmit a unique optical wavelength signal of a first wavelength set on the global optical waveguide, and a second plurality of transmitters each configured to transmit a unique optical wavelength signal of a second wavelength set on the global optical waveguide;
    a plurality of sets of receivers each of said set of receivers associated with each of said one or more global waveguides, said set of receivers having a having a plurality of receivers each configured to receive a unique optical wavelength signal of the first wavelength set from the global optical waveguide;
    one or more local waveguide(s) each coupled to one of the said one or more global waveguide(s) and configured to receive a unique optical wavelength signal of the first wavelength set and all optical wavelength signals of the second wavelength set; and
    one or more chiplet(s) each having one or more processing element (PE) set(s), each said PE set associated with one of said one or more local waveguide(s) and includes one or more PEs, wherein each PE of said PE set has a receiving mode wherein said PE receives a unique optical wavelength signal of the second wavelength set, and all PE(s) of said PE set receive a respective unique optical wavelength signal of the first wavelength set, and further wherein each PE of said PE set has a transmitting mode separate from the receiving mode, during which all PE(s) of said PE set transmit the respective optical wavelength signal of the first wavelength set sequentially.

2. The computer architecture of claim 1, wherein each interface comprising a set of Micro-Ring Resonator(s) (MRR(s)) each of said MRR couples a unique optical wavelength signal of the second wavelength set from the global optical waveguide to the local optical waveguide, a separate MRR that couples a unique optical wavelength signal of the first wavelength set from the global optical waveguide to the local optical waveguide, and another separate MRR that couples the same optical wavelength signal of the first wavelength set from the local optical waveguide to the global optical waveguide.

3. The computer architecture of claim 1, wherein, in the receiving mode, each PE of a said PE set receives a unique optical wavelength signal of the second wavelength set, and all PE(s) of a said PE set receive a unique optical wavelength signal of the first wavelength set.

4. The computer architecture of claim 1, wherein, in the receiving mode, the respective PE(s) of all said one or more PE set(s) connected to the same global optical waveguide receive a unique optical wavelength signal of the second wavelength set, and all PE(s) of each said one or more PE set(s) connected to the same global optical waveguide receive a unique optical wavelength signal of the first wavelength set.

5. The computer architecture of claim 4, wherein said first wavelength set comprises a first optical wavelength signal and a second wavelength signal, and said second wavelength set comprises a third optical wavelength signal and a fourth wavelength signal;
    wherein said one or more chiplets comprises a first chiplet having a first PE set of a first PE and a second PE, and a second chiplet having a second PE set of a third PE and a fourth PE;
    wherein, in the sending mode, the first and second PEs are configured to receive intra-set multicast with said first optical wavelength signal, the third and fourth PEs are configured to receive intra-set multicast with said second optical wavelength signal, the first and third PEs are configured to receive inter-set multicast with said third optical wavelength signal, the second and fourth PEs are configured to receive inter-set multicast with said fourth optical wavelength signal;

wherein, in the receiving mode, the first and second PEs are configured to transmit the first optical wavelength signal sequentially, the third and fourth PEs are configured to transmit the second optical wavelength signal sequentially.

6. The computer architecture of claim 1, wherein, in the transmitting mode, all PE(s) of each PE set transmits the same unique wavelength signal of the first wavelength set as in the receiving mode sequentially.

7. The computer architecture of claim 1, wherein the optical wavelength signals of the first and the second wavelength sets can partially or completely overlap, in which case transmission of optical wavelength signals of the first wavelength set and transmission of optical wavelength signals of the second wavelength set are performed in different time periods.

8. The computer architecture of claim 1, wherein each of said PE includes a, inter-set receiver for inter-set multicast, an intra-set receiver for intra-set multicast, and a transmitter.

9. The computer architecture of claim 1, wherein the transmission of optical wavelength signals in the first and second wavelength sets are completed in one clock cycle.

10. The computer architecture of claim 1, wherein each said PE perform computations with different pairs of input feature and weight as input data.

11. The computer architecture of claim 1, wherein said PE(s) of a said PE set perform operations sharing input feature data received from intra-set multicast, the respective PE(s) in all of said PE set(s) connected to the same global optical waveguide perform operations sharing weight data received from inter-set multicast, or vice versa.

12. The computer architecture of claim 1, wherein each said PE maximizes local reuse of intermediate data and minimizes the occasions of data writeback to the said unified global buffer.

13. A memory chip comprising:

a unified global buffer as memory space for temporary data storage;

one or more global waveguide(s);

one or more sets of transmitter(s) each of said set of transmitter(s) associated with each of said one or more global waveguide(s), said set of transmitter(s) having a first plurality of transmitter(s) each configured to send a unique optical wavelength signal of the first wavelength set, a second plurality of transmitter(s) each configured to send a unique optical wavelength signal of the second wavelength set;

one or a plurality of sets of receiver(s) each of said set of receiver(s) associated with each of said one or more global waveguide(s), said set of receiver(s) having a plurality of receiver(s) each configured to receive a unique optical wavelength signal of the first wavelength set; and a controller configured to manage the said unified global buffer, said one or more sets of transmitter(s), said one or more sets of receiver(s), interfaces, and processing elements (PEs).

* * * * *